United States Patent [19]

Canfield et al.

[11] Patent Number: 5,319,788

[45] Date of Patent: Jun. 7, 1994

[54] MODIFIED BATCHER NETWORK FOR SORTING N UNSORTED INPUT SIGNALS IN $LOG_2N$ SEQUENTIAL PASSES

[75] Inventors: Earl R. Canfield, Athens, Ga.; Stanley G. Williamson, Del Mar, Calif.

[73] Assignees: The Regents of University of Calif., Oakland, Calif.; University of Georgia Research Foundation, Athens, Ga.

[21] Appl. No.: 677,222

[22] Filed: Mar. 29, 1991

[51] Int. Cl.$^5$ ............... G06F 7/36; G06F 7/24; G06F 7/22
[52] U.S. Cl. ............... 395/800; 395/600; 340/146.2; 364/222.9; 364/962.2; 364/962.3; 364/DIG. 2
[58] Field of Search ............... 395/600, 800, 200, 325, 395/650; 340/146.2

[56] References Cited

U.S. PATENT DOCUMENTS

| | | | |
|---|---|---|---|
| 4,905,224 | 2/1990 | Lobjinski et al. | 370/60 |
| 4,956,772 | 9/1990 | Neches | 395/650 |
| 5,121,493 | 6/1992 | Ferguson | 395/600 |
| 5,216,420 | 6/1993 | Munter | 340/825.79 |

OTHER PUBLICATIONS

Natvig, "Logarithmic Time Cost Optimal Parallel Sorting is Not Yet Fast in Practice!", IEEE, Nov. 1990, pp. 486-494.

Bilardi, "Merging and Sorting Networks with the Topology of the Omega Network", IEEE, Oct. 1989, pp. 1396-1403.

Narasimha, "The Batcher-Banyan Self-Routing Network: Universality and Simplification", IEEE, Oct. 1988, pp. 1175-1178.

Primary Examiner—Thomas C. Lee
Assistant Examiner—Paul Harrity
Attorney, Agent, or Firm—Daniel L. Dawes

[57] ABSTRACT

The sorting and merging of unordered input signals is widely used in all types of information and communication circuits and methodologies. A sorting network is provided by providing a modified Batcher network. The network is recursively built up from a size 4 network to an arbitrary size. The modified Batcher network sorts N data items in $log_2N$ passes through the network, where N is the number of data items in each series. The network has a delay of $log_2N$ with comparators of $log_2N$ different lengths with a maximum length of N/2.

20 Claims, 3 Drawing Sheets

MODIFIED BATCHER NETWORK FOR SORTING N UNSORTED INPUT SIGNALS IN LOG₂N SEQUENTIAL PASSES

The Government of the United States may have rights in the subject invention pursuant to National Security Agency (Department of Defense) under Grant No. MDA904-88-H-2020.

BACKGROUND OF THE INVENTION

1. Field of the Invention

The invention relates to the field of electronic sorting networks and methodologies, and in particular to sorting networks, analogous to a Batcher merging circuit, which networks use comparators for sorting.

2. Description of the Prior Art

It is often necessary in a wide variety of computer operations and applications to sort among a plurality of inputs to order them or sort them into a hierarchical order such as in an alphanumeric ascending or descending series. The speed and size of the circuitry required to perform such a sort of this type often becomes an important parameter or limitation in the implementation of some larger process or apparatus.

Sorting methods and circuits may be classified as comparator-based or not. Among the comparator-based methodologies and circuits there are those which utilize feedback and those which do not. A comparator-based methodology and circuit which utilizes feedback is one in which the choice of a pair of data input items which are to be next compared is influenced by the history of previous comparison outcomes.

Methodologies and circuits which do not utilize feedback are more commonly described as simply networks for sorting. A typical prior art sorting network is diagrammatically depicted in FIG. 1. FIG. 1 shows a circuit for comparison of four words, $X_0$, $X_1$, $Y_0$ and $Y_1$. The four pairs of parallel input lines 16 and 18 are cross-coupled on a pair-wise fashion by comparator circuits 10 and 12, followed by crosspair connections through comparator circuit 14. FIG. 1 has been shown with two equivalent symbologies. On the left side is a very highly diagrammatic depiction of the network where vertical lines represent the comparators and the network lines are shown as unbroken horizontal lines. The actual physical circuit is more faithfully depicted by the equivalent depiction on the right side of FIG. 1 where the comparators are shown as blocks and the network lines are not continuous, but begin and terminate with a comparator. It turns out, however, that the topology of the circuit is more readily visualized in the style of the more abstract depiction, which will be used in the remaining Figures. The general taxonomy of sorting methodologies is described in Chapter 5 of Knuth, "SORTING AND SEARCHING," Vol. 3, "ART OF COMPUTER PROGRAMMING," Addison-Wesley, Reading, Mass. (1973).

The absence of any feedback as shown in a prior art sorting network of FIG. 1 allows such circuits to be implemented with low level hardware and allows for parallel implementation. However, in feedback free circuits, it has been difficult to obtain a sorting network with a number of comparators of an order equal to or less than N log₂N, where N is the number of data inputs. Although it has been theoretically determined that a sorting network of the order of N log₂N comparators with a delay of the order of log₂N does exist, explicit construction or examples of such networks have yet to be given. Therefore, as a practical matter, feedback free networks are still built along the lines of classical Batcher networks which have a delay of approximately $\frac{1}{2}(\log_2 N)^2$. See for example K. E. Batcher, "SORTING NETWORKS AND THEIR APPLICATIONS," Proceedings 1968 Spring joint COMP Conf. at pages 307-14, AFIPS Press, 1968.

Sequential balanced networks, such as described by Dowd, et al, "THE SEQUENTIAL BALANCED SORTING NETWORK," New Jersey Institute of Technological Research Report No. 10 describes the sequential balanced network in which data is passed sequentially log₂N times through design whose delay time is log₂N.

The material design features for a network are:

(1) Ease of specification of the network for any number of data items;
(2) Succinctness and understandability of verification;
(3) Minimal delay;
(4) Repeated sequential use of a single design;
(5) Minimal total number of comparators; and
(6) Minimal total number of different lengths among the comparators.

An AKS network achieves a delay (feature 3) through the network of the order of c log₂N, where c is a very large number, minimizes the number of comparators (feature 5), but has poor or unknown performance in each of the other four design categories. See Ajtai, et al, "AN ORDER OF N LOG N SORTING NETWORK," Proc. 15th Annual ACM Symposium on the Theory of Computing (SIGACT) Boston (1983).

The sequential balanced network described above and shown as FIG. 6 has a simple specification of the network for any number of data items, but has a large number of total different lengths among the comparators, for example, one finds all possible odd lengths.

An odd-even transposition network (Knuth, supra, Chapter 5) is very easy to specify, has repeated sequential use of a single design and a single length among the comparators, but performs poorly with respect to each of the other categories.

What is needed then is a sorting network that performs well in each of these categories without any particular mark or significant disadvantage in any one of them.

BRIEF SUMMARY OF THE INVENTION

The invention is a modified Batcher network for sorting and/or merging input signals. The invention is comprised of a first plurality of input lines corresponding to a first plurality of input signals and a second plurality of input lines corresponding to a second plurality of input signals. Generally, the first plurality of input signals have no specified order between them, and the second plurality of input signals have no specified order between them. The first and second plurality of lines are alternated among each other. The first line of the first plurality of lines is adjacent to the first line of second plurality of lines. The second line of the first plurality of lines is adjacent to the second line of second plurality of lines. The third line of the first plurality of lines is adjacent to the third line of second plurality of lines, and so forth, until the first and second plurality of lines are completely paired with each other. The invention also includes a plurality of comparators. Each comparator is coupled between two lines, one line belonging to the first plurality of lines and the other line to the second plurality of lines. The comparator receives input signals from the two lines and propagates outputs on the two lines according to a predetermined rule of ordering between the two input signals coupled to the comparator. The plurality of comparators are organized into a plurality of segments of comparators. Each segment operates at a different time or clock cycle and, accordingly, may be referred to as the first segment, the second segment. The number of segments in the network is referred to as the delay or delay time of the network. Each comparator within a segment of comparators is coupled to different lines of the first and second plurality of lines with no line coupled in common to two comparators within one segment. Each line is coupled, if at all, only to one comparator within each segment of comparators. The comparators are, for descriptive purposes only, referred to as of the first and second class. The comparators that form the final segment of comparators are those of the second class. All others are of the first class. Each comparator of the first class selectively couple lines which are from different sets of lines, namely the first or second plurality of lines, in such a way that two disjoint sets of lines are formed, one set which is coupled through a corresponding set of comparators of the first class and a second separate set which is coupled through a separate set of comparators of the first class. Comparators of the second class, which comprise the last segment of comparators, selectively couple lines together from the two disjoint sets of lines.

As a result, the totality of input signals, propagated in n sequential passes through the network, are sorted, where $n = \log_2 N$, and N, which for descriptive purposes is taken to be an integral power of 2, is equal to the total number of signals of the first and second plurality of signals taken together. If initially, the first plurality of input signals are in order and, separately, the second plurality of input signals are in order, then the totality of inputs are sorted (i.e. merged) in one pass through the network.

In the most basic embodiment, the first plurality of lines are two in number and the second plurality of lines are two in number corresponding in totality to four input signals. The first and second plurality of lines each have a first and second line. The first lines of the first and second pluralities are coupled together through a comparator and the second lines of the first and second pluralities are coupled together through a comparator. These two comparators are of the first class, and, taken together, comprise the first segment of comparators. The second class of comparators, in this case, comprises a single comparator coupling the first line of the second plurality of lines to the second line of the first plurality of lines. This comparator comprises the second, and final, segment of comparators. The first lines form a first adjacent pair of lines and the second lines form second adjacent pair of lines. The network is termed a network of size 4.

The network of size 8 further comprises two networks of size 4. The first and second networks of size 4 are interleaved with their respective lines on a pairwise basis. The first and second lines of the first network of size 4 are followed by the first and second lines of the second network of size 4. Next, the second and third lines of the first network of size 4 are followed by the second and third lines of the second network of size 4. Lines 1, 3, 5, and 7 comprise the first plurality of lines. Lines 2, 4, 6, and 8, and so forth, comprise the second plurality of lines. The first segment of comparators in the network of size 8 comprise the comparators of the first segment of the first network of size 4 taken together with the comparators of the first segment of the second network of size 4. The second segment of comparators in the network of size 8 is comprised of the comparators of the second segment of the first network of size 4 taken together with the comparators of the second segment of the second network of size 4. The comparators in these first two segments in the network of size 8 comprise the comparators of the first class. The final segment of comparators in the network of size 8 is comprised of three comparators coupled between adjacent lines of the first and second networks of size 4. This combined first and second network of size 4, together with this final segment of comparators, is termed a network of size 8.

The network of size 16 comprises two networks of size 8. The first and second networks of size 8 are interleaved with their respective lines on a pairwise basis. The first and second lines of the first network of size 8 are followed by the first and second lines of the second network of size 8. Next, the second and third lines of the first network of size 8 are followed by the second and third lines of the second network of size 8. Lines 1, 3, 5, and 7, and so forth, comprise the first plurality of lines. Lines 2, 4, 6, and 8, and so forth, comprise the second plurality of lines. The first segment of comparators in the network of size 16 are comprised of the comparators of the first segment of the first network of size 8 taken together with the first segment of the second network of size 8. The second segment of comparators in the network of size 16 are comprised of the comparators of the second segment of the first network of size 8 taken together with the comparators of the second segment of the second network of size 8. The third segment of comparators in the network of size 16 are comprised of the comparators of the third segment of the first network of size 8 taken together with the comparators of the third segment of the second network of size 8. The comparators in these first three segments in the network of size 16 comprise the comparators of the first class. The fourth and final segment of comparators in the network of size 16 is comprised of 7 comparators coupled between adjacent lines of the first network of size 8 and of the second network of size 8. This combined first and second network of size 8, combined with this final segment of comparators, is termed a network of size 16.

More generally, the network of size $N = 2^n$, alternatively referred to as the network of order n, is constructed recursively from the network of size $N = 2^{n-1}$ as indicated in previous paragraphs in the constructions of the network of size 8, constructed from the network of size 4, and the network of size 16, constructed form the network of size 8. The network of size $N = 2^n$ is constructed from the two networks of size $2^{n-1}$. The first and second networks of size $2^{n-1}$ are interleaved with their respective lines on a pairwise basis. The first and second lines of the first network of size $2^{n-1}$ are followed by the first and second lines of the first of size $2^{n-1}$. Next, the second and third lines of the first network of size $2^{n-1}$ are followed by the second and third lines of the second network of size $2^{n-1}$, and so forth. Lines 1, 3, 5, and 7, and so forth, of the resulting combined lines, comprise the first plurality of lines. Lines 2, 4, 6, and 8, and so forth, comprise the second plurality of lines. The first segment of comparators in the network of size $2^n$ comprise the comparators of the first segment of the first network of size $2^{n-1}$ taken together with the comparators of the first segment of the second network of size $2^{n-1}$. The second segment of comparators in the network of size $2^n$ comprise the comparators of the second segment of the first network of size $2^{n-1}$ taken together with the comparators of the second segment of the second network of size $2^{n-1}$, and so forth for segments 3, 4, etc., to segment $n-1$ of the network of size $2^n$. The comparators in these first $n-1$ segments in the network of size $2^n$ comprise the comparators of the first class. The $n^{th}$ and final segment of comparators in the network of size 2n comprise $2^{n-1}-1$ comparators coupled between adjacent lines of the first network of size $2^{n-1}$ and of the second network of size $2^{n-1}$. This combined first and second network of size $2^{n-1}$, together with this final segment of comparators, is termed a network of size $2^n$.

The invention and its various embodiments may be better visualized by now turning to the following drawings wherein like elements are referenced by like numerals.

The invention and its various embodiments may now be better understood by turning to the following detailed description.

DETAILED DESCRIPTION OF PREFERRED EMBODIMENTS

The sorting and merging of unordered input signals is widely used in all types of information and communication circuits and methodologies. A sorting network is provided by providing a modified Batcher network. The network is recursively built up from a size 4 network to an arbitrary size. The modified Batcher network sorts N data items in $\log_2 N$ passes through the network. The network has a delay of $\log_2 N$ with comparators of $\log_2 N$ different lengths with a maximum length of $N/2-1$.

Figure 2:
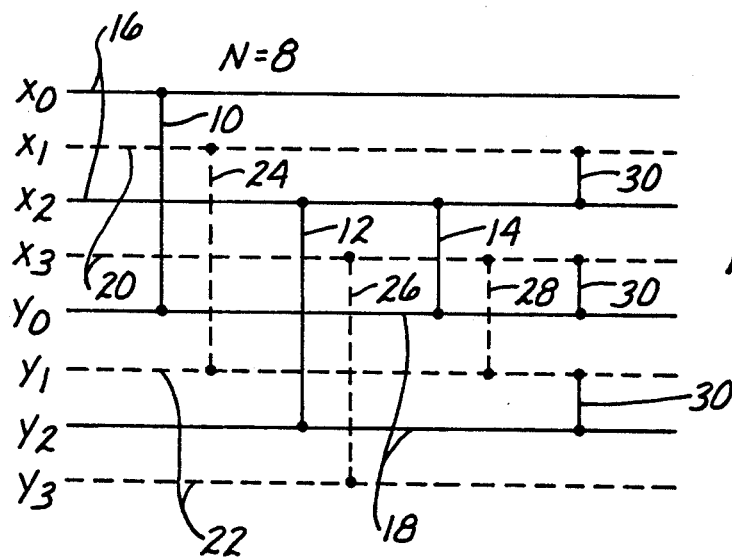
FIG. 2 is a schematic diagram of a prior art Batcher network of size N=8 illustrating how the structure of one network of order n=3 is derived from a network of order n=2.

FIG. 2 represents a prior art Batcher merging network of size 8. The Batcher merging network is well understood and known to take two already sorted, series of numbers $X_0 \ldots X_3$ and $Y_0 \ldots Y_3$ and produce a merged series wherein both of the series taken together are then sorted, usually in ascending order. In other words, $X_0 < X_1 < X_2 < X_3$ and $Y_0 < Y_1 < Y_2 < Y_3$ at the inputs. After one pass through the Batcher merging network of FIG. 2, the outputs will then be a single sorted sequence in an appropriate ascending order.

Figure 1:
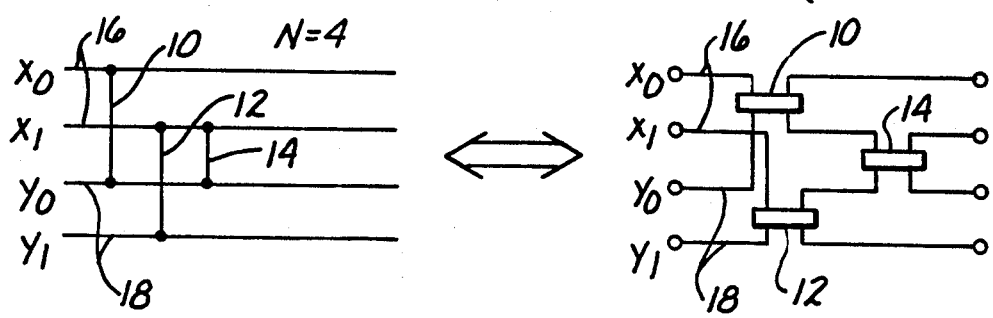
FIG. 1 is a schematic diagram of a Batcher sorting network of size 4 typical of the prior art.

FIG. 1 is a Batcher network of size 4, that is 4 inputs. The eight input network of FIG. 2 is built up from the four input network by starting with two disjoint networks of X and Y inputs, building the network or cross-connecting the input lines on the even X's and even Y's, and building a second network on the odd X's and odd Y's. To these two disjoint networks, a final layer of comparators are provided which cross-connect the second and third elements, the fourth and fifth elements, and so on until the adjacent pairs of the two disjoint networks have all been cross-connected.

The networks of the present invention are built up in the same manner, but beginning from a different series of disjoint networks as described below. First however consider how the network of FIG. 2 can be built up from the network of FIG. 1. Once its evolution is understood, it is then readily extended to build up a network of arbitrary size. An understanding of this evolution or recursion will aid in understanding how the evolution or recursion of the present invention differs.

In FIG. 1 note lines 16 corresponding to inputs $X_0$ and $X_1$ and lines 18 corresponding to inputs $Y_0$ and $Y_1$. The inputs are to be understood as including within their scope multiple bit numbers although a single line 16 or 18 is diagrammatically depicted. According to the construction recited above, the Batcher networks are recursively constructed beginning from a starting point defined by FIG. 1. The network of FIG. 2 is then derived from FIG. 1 by placing two identical networks of size N=4 on top of each other with a line from one network placed between two lines from the other network. Now the network will be seen as having 8 input lines. These input lines are relabeled with the inputs $X_0 \ldots X_3$ and $Y_0 \ldots Y_3$ in the order as shown in FIG. 2. The lines and comparators as referenced in FIG. 1 have been carried over into FIG. 2 with the same reference numerals so that the recursive generation of the network of FIG. 2 from FIG. 1 can be better understood. In addition the lines from the added network have been shown in dotted outline for contrast and sake of clarity of illustration. Thus lines 20 have been added for the two new odd X lines and lines 22 for the two new odd Y lines. Comparators 10, 12 and 14 are carried over into the expanded network of FIG. 2 to connect the same lines 16 in the same combination as shown in FIG. 1. However, added to the expanded network of FIG. 2 is comparator 24 connecting what is now labelled as the $X_1$ and $Y_1$ lines 20 and 22 respectively and comparator 26 coupling the $X_3$ and $Y_3$ lines, 20 and 22 respectively. Comparator 14 now serves to connect the $X_2$ and $Y_0$ lines 16 and 18 respectively and is duplicated by adding comparator 28 connecting in symmetry the $X_3$ and $X_1$ lines 20 and 22 respectively. Finally, an additional layers of comparators 30 are added connecting the second and third, fourth and fifth, and sixth and seventh lines corresponding to $X_1$ and $X_2$, $X_3$ and $Y_0$, and $Y_1$ and $Y_2$.

What results is a Butcher network of size 8 which will take two presorted series, X and Y, and then merge them into a sorted series. It can be appreciated by comparing FIGS. 1 and 2 that the solid lines are a Batcher network of size 4 as shown in FIG. 1, and that the dotted lines also comprise of Batcher network of size 4 as shown in FIG. 1 wherein the two networks have been interleaved so that their lines are alternated. To these disjoint and interleaved networks is added a final layer of comparators 30 which cross-connect the two size 4 networks, thereby comprising a combination which as a whole which is a size 8 network.

Figure 3:
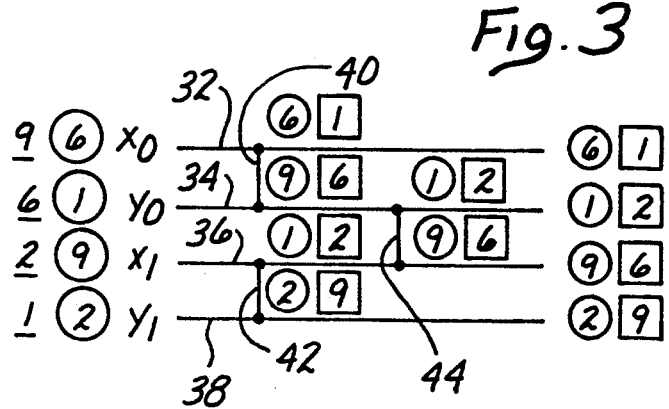
FIG. 3 is a schematic diagram of a modified Batcher network of size N=4 devised according to the invention.

Turn now to the size 4 network of the present invention as diagrammatically depicted in FIG. 3. Here there are four input lines 32, 34, 36 and 38 having corresponding inputs $X_0$, $Y_0$, $X_1$ and $Y_1$. Again each of these lines may be multiple bit inputs, but are represented diagrammatically as a single line. The network of the invention of FIG. 3 is to be contrasted with the Batcher network of FIG. 1, where the inputs remain segregated in their original X or Y series, while in the invention the X and Y input series are alternated on a term-by-term basis.

In the invention, a first layer of comparators 40 and 42 cross-connect the even X and Y's and the odd X and Y's. Namely, comparator 40 cross-couples line 32 having input $X_0$ with line 34 having input $Y_0$. Similarly, comparator 42 cross-couples lines 36 with input $X_1$ to line 38 with input $Y_1$. A final layer of comparators, in this case comprised of a single comparator 44, then cross connects the second and third lines, lines 34 and 36 corresponding to $Y_0$ and $X_1$.

The surprising result is that the network of FIG. 3 not only merges the presorted X and Y series after one pass, but after two sequential passes, also sorts them even if the X and Y series are not presorted. These sequential passes can be performed by duplicating the network to form two networks of the type shown in FIG. 3 and connecting them end to end. Alternatively, the outputs from the first pass can be fed back to the inputs of the same network and then repropagated to the outputs as a sorted series at the end of the second pass.

Figure 4:
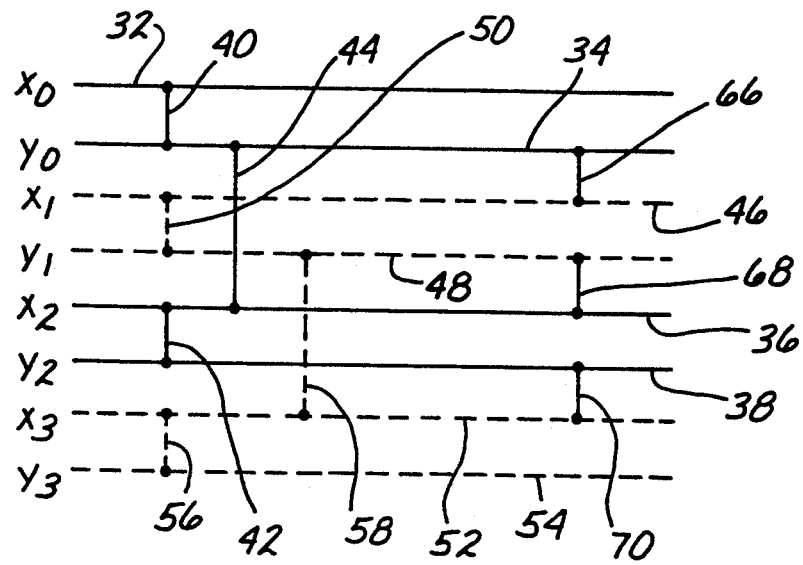
FIG. 4 is a schematic diagram of a modified Batcher network of size N=8 devised according to the invention from the network of FIG. 3.

Consider now the invention as shown in FIG. 4 wherein a network of size 8 is depicted. Again corresponding lines and elements from FIG. 3 have been reproduced with the same reference numerals of FIG. 4 in order to better illustrate how the larger sized network is recursively built up. Two size 4 networks of FIG. 3 are interleaved in a manner shown in FIG. 4 and as now described. One network is shown for the sake of clarity in solid lines while the interleaved network is shown in dotted line to better contrast the two to make them visually apparent. The inputs however have been relabeled to form an alternating series of pairs from $X_0$, $Y_0$ to $X_3$, $Y_3$. Lines 32 and 34 again are cross-connected by comparator 40 as shown in FIG. 3. The other input pair of the same network couples lines 36 and 38 now corresponding to inputs $X_2$ and $Y_2$ respectively and coupling them through comparator 42 as before. However, interleaved between this pair is a pair of another size 4 network comprised of lines 46 and 48 corresponding to inputs $X_1$ and $Y_1$ respectively cross-coupled by comparator 50. Similarly, new inputs $X_3$ and $Y_3$ on lines 52 and 54 respectively are coupled by a new comparator 56. This comprises the first layer or segment of comparators in the network of FIG. 4.

The second layer or segment of comparators is comprised of comparator 44 again coupling lines 34 and 36. A corresponding comparator 58 couples lines 48 and 52. Therefore the solid lined network, including comparators 40, 42 and 44, is interleaved in a pair-wise fashion with an identical added network comprised of comparators 50, 56 and 58.

Finally a correction layer of comparators 66, 68 and 70 are then added between the second and third lines 34 and 46 respectively, the 4th and 5th lines, lines 48 and 36 respectively, and the 6th and 7th lines, lines 38 and 52 to cross connect the otherwise two disjoint size 4 comparators to recursively form a size 8 network according to the invention.

For the further purposes of clarity consider now the recursive construction of a size 16 network according to the invention from two interleaved networks of size 8 as shown in FIG. 4. Again reference numerals referring to identical elements are carried forward into FIG. 4 as a solid line network. An identical interleaved network is shown with new references numerals in dotted outline. The inputs have been relabeled to form an alternating series of eight X's and eight Y's. A comparison of FIGS. 4 and 5 reveals that the network of FIG. 4 has been interleaved in a pair-wise fashion with an identical dotted network. The dotted network is comprised of lines 80–94 with a corresponding number of comparators 72–78 forming part of a first segment of comparators along with comparators 40, 50, 42, and 56.

Figure 5:
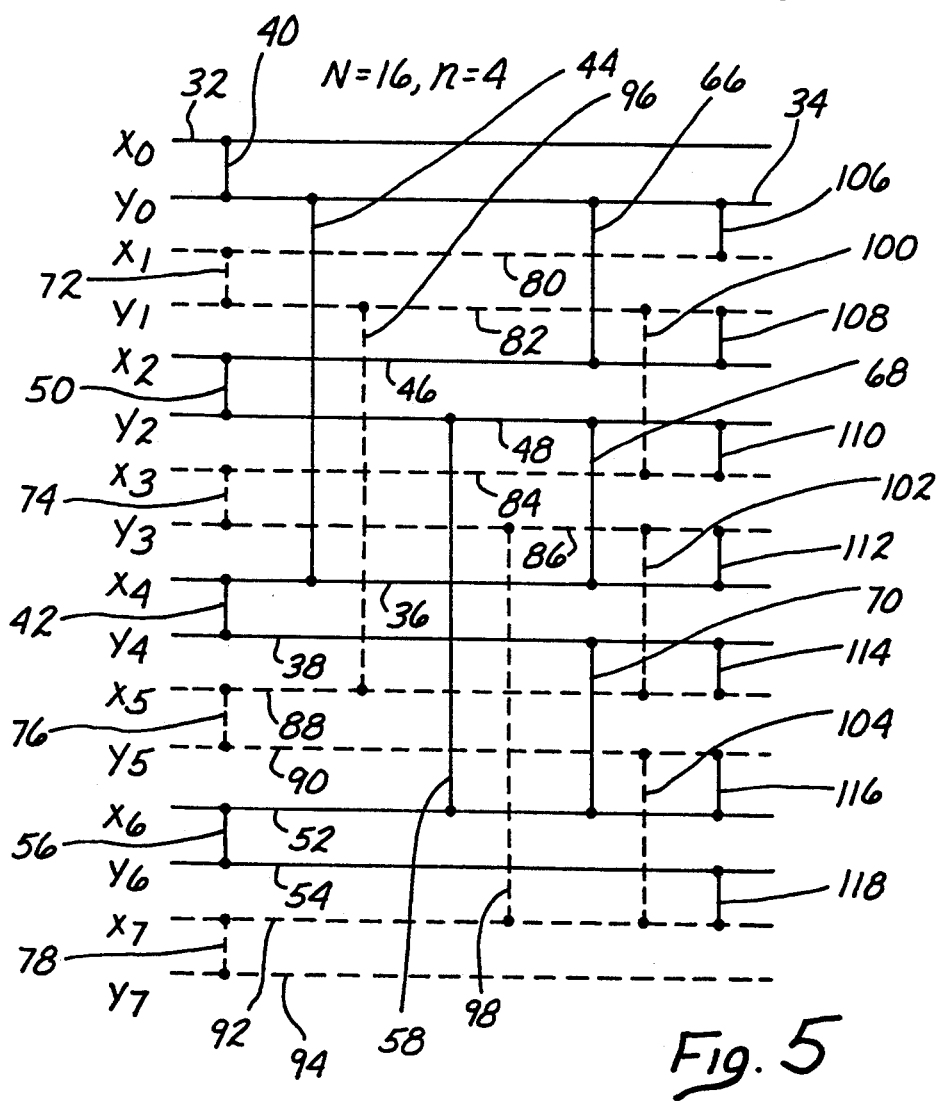
FIG. 5 is a schematic diagram of a modified Batcher network of size 16 devised according to the invention illustrating how the structure of a network of size N=16 can be generated from a of a network of size N=8.

A second segment or layer of comparators is comprised of new comparators 96 and 98 coupled to the dotted network in the same manner as old comparators 44 and 58 are coupled to the solid network shown in FIG. 5.

A third layer of segmented comparators shows new comparators 100–104 coupling the dotted network in the same manner as comparators 66, 68 and 70 couples a solid network in FIG. 5. Thus far the dotted network and the solid network are disjoint or not connected to each other.

A last layer of corrective comparators is then added, namely comparators 106–118 to couple the second and third, fourth and fifth, sixth and seventh, eighth and ninth, tenth and eleventh, twelfth and thirteenth, fourteenth and fifteenth lines of the solid and dotted network as shown in the interleaved pattern of FIG. 5. In other words all the adjacent lines of the two disjoint networks. Together, these cross-coupled networks of size 8 comprise a network of the invention of size 16.

Two series of eight numbers, $X_0$–$X_7$ and $Y_0$–$Y_7$ with no assumed order relations within or among them are input into the network of FIG. 5 and after four sequential passes through the network, what results is a sorted series of sixteen numbers. This assertion is not valid in the case of prior art Batcher networks. The network of FIG. 5 may then continue to be built up to form a network of size 32 and so forth to any arbitrary size of power 2. Networks of size M, not a power of 2, can be derived from these networks of size of power 2. One method of doing this is to look at the network of size $2^n$ where n is the smallest order such that $M < 2^n$. One can then assume that an input larger than all other inputs is input to lines $M+1$, $M+2$, ..., $2^n$. Any comparator that contacts this largest input can be discarded from the network of size $2^n$ to obtain a network that sorts any M inputs in at most n sequential passes.

Consider now some of the design characteristics of the networks of the invention, which can be generally stated. The first important and rather surprising property of these class of networks is that any input, even those which have no sorting whatsoever, will be sorted by the network after n sequential passes where $n = \log_2 N$, N being the total number of input numbers in both series. The number of comparators in the network is $(n-1)2^{(n-1)} + 1$. The length of the comparators, that is the number of vertical spacings as shown in the Figures over which the comparator lines must be laid for N greater than or equal to 2 form a series (1, 3, 7, 15, ..., $2^{(n-1)}-1$.

Figure 6:
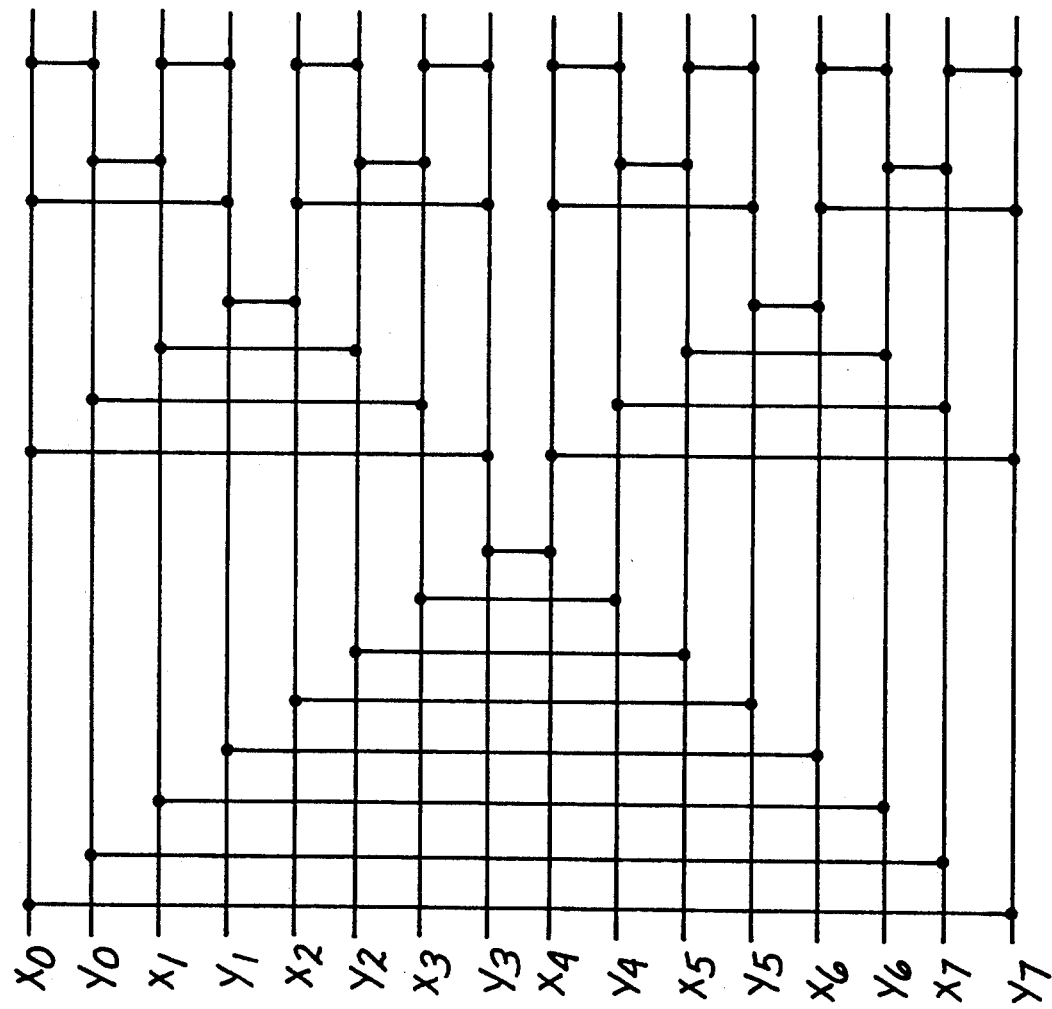
FIG. 6 is a schematic diagram of a balanced sequential network of size 16 of the prior art illustrating the differences in structure of the prior invention by comparison to FIG. 4 showing a network of the same size according to the invention.

For a comparison purposes in a prior art sequential balance network as depicted in FIG. 6, the comparators form a series of the form (1, 3, 5, ..., $2^{(n-1)}$). The network of the invention will always merge the two series of input numbers, provided the x-inputs and y-inputs are each separately sorted. In addition to merging such presorted series, the network of the invention will sort arbitrary input sequences, having no preconditions, after n sequential passes.

As a simple example, return to the embodiment of FIG. 3 for a size 4 network. Consider two simple series of numbers, $X_0$, $X_1$ equal to (9, 2). The next series, $Y_0$, $Y_1$, is (6, 1). Neither series is sorted. Assuming these numbers are input into the left hand side of the network as shown in FIG. 3. In the first time cycle or clock period, comparator 40 will output a 6 on line 32 and a 9 on line 42. At the same time comparator 42 will output a 1 on line 36 and a 2 on line 38. By definition a comparator will always pass the smaller number to the top line. It is entirely within the scope of the invention that the reverse could be true.

On the next clock cycle or time period, if there is no clock, comparator 44 will place a 1 on line 34 and a 9 on line 36. Therefore at the end of the first pass the sequence is 6, 1, 9, 2 as shown in FIG. 3. Assume now that this series is reinput to the network of FIG. 3 or at least passes through an identical adjacent sequential network. Comparator 40 will place a 1 on line 32 in the second pass and 6 on line 34. At the same time comparator 42 will place a number 2 on line 36 and the number 9 on line 38. At the next clock cycle or time period, if there is no clock, comparator 44 will place 2 on line 34 and 6 on line 36. At the end of the second pass the output sequence is now 1, 2, 6, 9. The unsorted inputs have been sorted in two sequential passes.

Consider how these networks satisfy each of the design criteria or goals discussed above. A network of any size can be easily specified from its recursive construction built up from the simply defined network of FIG. 3. The network delay is of the order of $\log_2 N$ which compares favorably to prior art networks. The number of comparators which must be used is of the order of N fewer comparators than previously realized in a balanced sequential network such as shown in FIG. 6 of size 16 shown for visual comparison to the size 16 network of FIG. 5. The comparators of the present invention have lengths between the lines of $\log_2 N$ different lengths with the largest length being $N/2-1$. The simple design of the network is repeated n sequential times by simply repeating the exact same design network n times. Therefore, the design criteria discussed above are well met by the present invention to a degree not previously achieved by any known practically realizable prior art network.

Many alterations and modifications may be made by those having ordinary skill in the art without departing from the spirit and scope of the invention. Therefore, it must be understood that the invention has been set forth in the illustrated embodiments only by way of example and should not be limited by the described examples. For example, although the invention has been described in terms of dedicated hardwire circuitry, it is expressly understood that the circuitry and methodology may also be implemented in a general purpose computer subject to appropriate software control. The invention is defined in the following claims which are to be read to include not only what is literally set forth but all means equivalent thereto for performing substantially the same function in substantially the same manner to obtain substantially the same result.

We claim:

1. A sorting network for merging and/or sorting a first and second plurality of unsorted input signals, where said first and second plurality of input signals are characterized by a total number, and where N is equal to a total number of said input signals, comprising:

a first plurality of lines corresponding to said first plurality of input signals;

a second plurality of lines corresponding to said second plurality of input signals;

wherein said first and second plurality of lines are alternated among each other so that a first line of said first plurality of lines is adjacent to a first line of said second plurality of lines, a second line of said first plurality of lines is adjacent to a second line of said second plurality of lines, a third line of said first plurality of lines is adjacent to a third line of said second plurality of lines and so forth until said first and second plurality of lines are completely paired with each other;

a plurality of comparators, each said comparator being coupled between two lines of said first and second plurality of lines, said comparator for receiving input signals from said two lines and for propagating outputs on said two lines according to a predetermined rule of ordering between said two input signals coupled to said comparator; and wherein said plurality of comparators are organized into a plurality of segments of comparators, each said comparator within each said segment of comparators being coupled to different ones of said first and second plurality of lines with no lines coupled in common to two comparators within one segment, each said line being coupled if at all only to one of said comparators within each said segment of comparators, said comparators comprising a first and second set, said first set of comparators coupling said first and second plurality of lines into two disjoint sets of lines defined as a first and second set of lines, said sets of lines are not coupled to each other, said second set of comparators for coupling said first and second set of lines, so that said first and second plurality of input signals propagated in n sequential passes through said network are sorted, where $n = \log_2 N$.

2. The network of claim 1 wherein said first plurality of lines are two in number and said second plurality of lines are two in number corresponding in totality to four input signals, said first and second plurality of lines each having a first and second line, said first lines of said first and second pluralities being coupled together through one of said comparators and said second lines of said first and second plurality of lines being coupled together through another one of said comparators, said first lines comprising said first set and said second lines comprising said second set, said comparators coupling said first and second lines comprising one of said segments of said comparators of a first type, a second type of comparator comprising a comparator coupling said first line of said second plurality of lines to said second line of said first plurality of lines, said first lines forming a first adjacent pair of lines and said second lines forming a second adjacent pair of lines, said pair of lines only being coupled together by said second type of comparator, said network being termed a network of size 4 (order 2).

3. The network of claim 2 wherein said network is defined as a first network of size 4 and further comprising:
- a second network of size 4, said first and second networks of size 4 being interleaved with their respective first and second lines on a pairwise basis, said first two lines of said first network of size 4 being adjacent to said first two lines of said second network of size 4, said second two lines of said first network of size 4 being adjacent to said second two lines of said second network of size 4, said eight lines of the combined said first and second networks of size 4 comprising said first and second sets of lines corresponding to said first network of size 4 and said second network of size 4 respectively; and
- three comparators comprising a segment of comparators coupled between adjacent lines of said first network of size 4 and of said second network of size 4,
- whereby said combined first and second networks of size 4 are termed a network of size 8 (order 3).

4. The network of claim 3, wherein said network of size 8 is defined as a first network of size 8, and further comprising:
- a second network of size 8, said first and second networks of size 8 interleaved in a pairwise fashion with each other so that one pair of lines from said first network of size 8 is adjacent another pair of lines from said second network of size 8; and
- seven comparators, each said comparator being coupled between adjacent lines of said first and second networks of size 8, said second comparator comprising a segment of comparators,
whereby said combined first and second networks of size 8 is termed a network of size 16 (order 4).

5. The network of claim 1 wherein said first and second plurality of lines and said plurality of comparators are recursively structured from a network of size 4, said network of size 4 comprising four lines and three comparators, said four lines being organized in two pairs, a first and second line of said four lines being coupled by a first one of said comparators, and a third and fourth line of said four lines being coupled by a second one of said comparators, said first and second comparators forming a first segment of comparators, said second and third lines being coupled by a third one of said comparators, said third comparator forming a second segment of comparators;
- wherein a higher order network of order n comprises a plurality of additional comparators and two networks on the next lower order n−1, said network of order n being recursively constructed by interleaving pairs of lines of two networks of the next lower order n−1 to form said first and second disjoint sets of lines, and by coupling adjacent lines of said two next lower ordered networks with an additional segment of comparators, said lower order network of order n−1 being similarly recursively constructed from said network of size 4 (order 2).

6. A sorting and/or merging network comprising:
- a first plurality of unsorted input signals, $X_0, X_1, X_2, \ldots X_{N-1}$;
- a first plurality of lines corresponding to said first plurality of input signals, said first plurality of lines being defined as a first, second, and so forth line until all of said lines of said first plurality have a defined order;
- a second plurality of input signals $Y_0, Y_1, Y_2, \ldots Y_{N-1}$;
- a second plurality of lines corresponding to said second plurality of input signals, said second plurality of lines being defined as a first, second, and so forth line until all of said lines of said second plurality have a defined order;
- wherein said lines corresponding to said input signals $X_0, X_2, X_4 \ldots$ and said lines corresponding to $Y_0, Y_2, Y_4, \ldots$ being termed even X lines and even Y lines respectively, and said lines corresponding to input signals $X_1, X_3, X_5, \ldots$ and $Y_1, Y_3, Y_5, \ldots$ being termed odd X lines and odd Y lines respectively, each even X line corresponding to said input signals $X_0, X_2, X_4, \ldots$ being disposed adjacent to one of said even Y lines corresponding to said input signals $Y_0, Y_2, Y_4, \ldots$, and each odd X line corresponding to said input signals $X_1, X_3, X_5 \ldots$ being disposed adjacent to one of said odd Y lines corresponding to said input signals $Y_1, Y_3, Y_5, \ldots$, pairs of said even X and Y lines being disposed adjacent to pairs of said odd X and Y lines;
- a plurality of comparators, each said comparator being coupled to a pair of said lines selected from said first $(X_0, X_1, X_2, \ldots X_{N-1})$ and said second $(Y_0, Y_1, Y_2, \ldots Y_{N-1})$ plurality of lines, said comparator for ordering said input signals $(X_0, X_1, X_2, \ldots X_{N-1})$ and $(Y_0, Y_1, Y_2, \ldots Y_{N-1})$ on said corresponding lines according to a predetermined rule;
- wherein said comparators and lines are organized in said network to recursively form a four line basic subnetwork of size 4, said paired lines within said subnetwork being defined as a first line and second line forming one of said pairs of lines, as a third line and fourth line forming a next one of said pairs and so forth until all said lines of said subnetwork are ordered, said subnetwork of size 4 coupling an even X line and even Y line together through a first one of said comparators and coupling an odd X line and odd Y line through a second one of said comparators, said second and third line of said network of size 4 being coupled together by a third one of said comparators, said first and second comparators forming a first segment of comparators and said third comparator forming a second segment of comparators, each said segment of comparators being operative to compare said input signals and propagate outputs at a different time;
- wherein said network is recursively constructed from combinations of said network of size 4 patterns to form increasingly higher order networks, two of said network of size 4 patterns being combined to form a network of order 3, two networks of said third order being combined to form a network of order 4, and so forth, so that said first and second plurality of lines comprising an nth ordered network is comprised of two networks of order n−1, said odd X and Y lines formed by one of said n−1 order networks and said even X and Y lines formed by said second n−1 order network, said first and second n−1 order networks being coupled together by an additional segment of said plurality of comparators, one of said additional segments of said plurality of comparators coupling second and third lines of said nth order network, fourth and fifth lines of said nth order network, sixth and seventh lines of said nth order network and so on until each remaining consecutive pair of lines of said nth order network are coupled by said additional segment of comparators, whereby said sorting and/or merging network is provided which sorts said X input signals and Y input signals after n sequential passes.

7. The network of claim 6 wherein one of said input signals coupled to said comparators has a lower magnitude than said other one of said input signals coupled to said comparator, and wherein said predetermined rule of said comparators is to communicate said lower magnitude input signal to a lower ordered one of said lines coupled to said comparator, each of said X lines being disposed as a first line of such even and odd pairs and considered the lowest ordered line between two adjacent X and Y lines corresponding to the $X_i$ or $Y_i$ input signal corresponding to a given sequence number, i.

8. The network of claim 6 wherein said network is comprised of n identical repetitions of said nth order network, said n networks being serially coupled together so that said input signals pass in serial sequence through said n networks.

9. A sorting network defined as a basic network of size 4 (order n=2) comprising:

four lines corresponding to four input signals constituting a first, second, third and fourth line, whereby said first line is adjacent said second line, said second line is adjacent said third line, and said third line is adjacent said fourth line, said four input signals constituting a first and second series of signals, X and Y respectively, wherein each signal has a magnitude, said magnitude of said signals being unordered on said lines;

a first comparator coupled to said first line corresponding to said first series of signals, X, and to said second line corresponding to said second series of signals, Y, for comparing said corresponding signals on said first and second lines, said first and second lines being termed even lines of said series, X and Y;

a second comparator coupled to said third and fourth lines, said third line corresponding to said first series, X, and said fourth line corresponding to said second series, Y, said third and fourth lines being termed odd lines, said first and second comparator for comparing said signals coupled thereto and for propagating said signals on corresponding output lines according to a predetermined rule relating to said magnitude of said signals on each said line coupled to said corresponding comparator;

a third comparator coupled between said second and third lines; and wherein said first and second comparators comprise a first segment of comparators and wherein said third comparator comprises a second segment of comparators, so that said sorting network of size 4 (order 2) sorts and merges said first and second series of signals, X and Y, when said series is twice passed through such a sorting network of size 4 (order 2).

10. The network of claim 9 further comprising:

two said basic networks of order n=2 and collectively being termed a first and second network of size 4, said first and second lines of first network of size 4 being disposed adjacent to said first and second lines of said second network of size 4, said third and fourth lines of said first network of size 4 similarly disposed adjacent to said third and fourth lines of said second network of size 4 and also being disposed adjacent to said first and second lines said second network of size 4; and a plurality of fourth comparators, said two basic networks being coupled together through said plurality of fourth comparators, one of said fourth comparators coupling adjacent ones of said lines of said first and second basic networks so that said two basic networks are coupled together, said fourth comparators comprising an additional segment of comparators, said sorting network being termed a sorting network of order n=3.

11. The sorting network of claim 10 further comprising:

an additional sorting network of order n=3, each said sorting network of order n=3 having eight lines arranged in alternating pairwise fashion between said two sorting networks of order n=3; and a plurality of fifth comparators for coupling said two sorting networks of order n=3, each line of one of said sorting networks of order n=3 which is adjacent to a line of said other sorting network of order n=3 being coupled together through one of said fifth comparators, said fifth comparators comprising an additional segment of comparators, said two coupled sorting networks of order n=3 being termed a sorting network of order n=4.

12. A method of sorting and merging two series of unsorted input signals in a modified Batcher network having a first plurality of lines corresponding to a first plurality of said input signals; a second plurality of lines corresponding to a second plurality of said input signals; wherein said first and second plurality of lines are alternated among each other so that a first line of said first plurality of lines is adjacent to a first line of said second plurality of lines, a second line of said first plurality of lines is adjacent to a second line of said second plurality of lines, a third line of said first plurality of lines is adjacent to a third line of said second plurality of lines and so forth until said first and second plurality of lines are completely paired with each other; a plurality of comparators, each said comparator being coupled between two lines of said first and second plurality of lines, said comparator for receiving input signals from said two lines and for propagating outputs on said two lines according to a predetermined rule of ordering between said two input signals coupled to said comparator; and wherein said plurality of comparators are organized into a plurality of segments of comparators, each said comparator within each said segment of comparators being coupled to different ones of said first and second plurality of lines with no lines coupled in common to two comparators within one segment, each said line being coupled if at all only to one of said comparators within each said segment of comparators, said comparators comprising a first and second set, said first set of comparators coupling said first and second plurality of lines into two disjoint sets of lines defined as a first and second set of lines, said sets of lines are not coupled to each other, said second set of comparators for coupling said first and second set of lines, so that said first and second plurality of input signals propagated in n sequential passes through said network are sorted, where $n = \log_2 N$ and N is equal to a total number of said input signals; the method comprising the steps of:

associating said series of input signals in an alternating pairwise fashion, said input signals of said series being ordered to comprise a plurality of even input signals and outputs in each series, said pairs of associated input signals comprising associated even pairs and associated odd pairs;

coupling said even pairs to a first one of said modified Batcher networks of order $n-1$;

coupling said odd pairs of said input signals to a second one of said modified Batcher networks of order $n-1$;

cross-coupling outputs of said two modified Batcher networks of order $n-1$ with each other to produce an output of a network of order n, said cross-coupling occurring between adjacent lines corresponding to said pairs of input signals of said two networks, said lines being adjacent in the sense that a line corresponding to an input of one series is coupled through a comparator to a line corresponding to a next higher ordered input of the other series; and sequentially propagating said outputs a predetermined number of times n to generate a sorted and merged series in a predetermined order.

13. The method of claim 12 wherein said comparators have input signals coupled thereto with possibly different magnitudes and have outputs coupled to ordered lines and wherein said comparators coupling said modified Batcher networks of order $n-1$, as well as comparators within each of said modified Batcher networks of order $n-1$, pass a lower magnitude input signal coupled to said comparator to a lower ordered line in said modified Batcher network.

14. The method of claim 12 where said two series of input signals comprise two series of two input signals each, said step of coupling said even pairs and odd pairs of input signals to corresponding lines of modified Batcher networks comprises the step coupling said odd pair of said first ones of said two input signals from said two series of two input signals through a comparator, said comparator placing a smaller one of said two input signals on a lower ordered line coupled to an output of said comparator, said odd pair of input signals being coupled to a comparator and a smaller one of said two odd pair of input signals being coupled to a lower ordered line coupled to the output of said comparator, where the step of cross-coupling comprises the step of coupling a higher ordered line of said even pair of lines through a comparator to a lower ordered line of said odd pair of lines, said cross-coupling comparator placing the lower one of said signals coupled to its input signals on the lower ordered line coupled to its outputs.

15. The method of claim 12 wherein said step of coupling said even pair of input signals to corresponding even lines of said first Batcher network and coupling odd pairs of said input signals to said corresponding odd lines of said second modified Batcher network, said odd and even pairs of input signals are alternated.

16. The method of claim 12 wherein signals in said first and second modified Batcher networks are disjoint except for said step of cross-coupling wherein signals coupled along said lines within said modified Batcher networks may be exchanged by said cross-coupling comparators.

17. The method of claim 12 where said steps of associating, coupling and cross-coupling said input signals are performed respectively by associating, coupling and cross-coupling conductive lines disposed in a circuit.

18. The method of claim 12 wherein said steps of associating, coupling and cross-coupling are performed with respect to virtual lines within a general purpose computer.

19. The method of claim 12 wherein said step of sequentially propagating said input signals through said modified Batcher networks is performed by sequentially propagating said input signals through n sequentially connected modified Batcher networks of order n.

20. The method of claim 12 whereas the step of sequentially propagating the input signals comprises the step of propagating said input signals through said modified Batcher network of order n, n times in sequence.

* * * * *